United States Patent [19]
Milani

[11] 3,801,249
[45] Apr. 2, 1974

[54] APPARATUS FOR EXTRUDING PROFILES OF THERMOPLASTIC MATERIAL

[75] Inventor: Giuseppe Milani, Lonate Pozzolo, Italy

[73] Assignee: Apparecchiature E. Macchine Utensili S.A.S. di Milani Guiseppe & C., Morano, Ticino (Novara), Italy

[22] Filed: Oct. 18, 1971

[21] Appl. No.: 190,034

[52] U.S. Cl. ............... 425/204, 425/131, 425/461, 425/463
[51] Int. Cl. ........................... B29b 1/04, B29d 7/02
[58] Field of Search ............ 264/177 R, 177 F, 176; 425/204, 223, 224, 190, 376, 130, 131, 463, 462

[56] References Cited
UNITED STATES PATENTS

| | | | |
|---|---|---|---|
| 1,603,812 | 10/1926 | Stein | 425/131 X |
| 1,603,813 | 10/1926 | Stein | 425/131 X |
| 1,338,799 | 5/1920 | Thomas | 425/463 |
| 2,391,050 | 12/1945 | Horn | 425/463 X |
| 3,499,186 | 3/1970 | Sassa | 425/204 X |
| 3,525,124 | 8/1970 | Ocker | 425/204 |
| 2,489,951 | 11/1949 | Bump | 425/461 |
| 2,587,930 | 3/1952 | Uschmann | 425/461 X |
| 3,522,628 | 8/1970 | Eberle et al. | 425/204 X |
| 3,632,702 | 1/1972 | Carrow | 264/237 |

FOREIGN PATENTS OR APPLICATIONS

| | | | |
|---|---|---|---|
| 966,424 | 8/1964 | Great Britain | 425/204 |

*Primary Examiner*—Robert L. Spicer, Jr.
*Attorney, Agent, or Firm*—Schlesinger, Fitzsimmons & Schlesinger

[57] ABSTRACT

A method and a machine are disclosed for the extrusion of a plastic material, in which the width of the extruded product predominates over its other dimensions, such as is the case with sheets, slabs and the like. A plurality of extrusion screws of conventional make are placed parallel and close together towards a single and common spinneret. Adjustment means for the temperature and the speed of the screws are provided in order to obtain a selective control.

9 Claims, 9 Drawing Figures

APPARATUS FOR EXTRUDING PROFILES OF THERMOPLASTIC MATERIAL

It is known that the most widely used product for the manufacture of artifacts such as doors, partition walls and the like, consists of slabs having a considerable width and made of composite wood, these slabs in addition to having a considerable mechanical stability, are obtainable with the desired width; however the artifact manufacture is time consuming and expensive.

Another disadvantage of the wood resides in that this material is readily ignited and poorly adaptable to the requirements both of the manufacture and of the desired product itself. Lastly, the wood is sometimes not readily available.

With respect to the above mentioned artifacts, it has been suggested in the past to substitute plastics for the wood, particularly extruded plastics, which eliminate most of the already stated disadvantages and, especially, permit the final product to be obtained in a rapid, easy and economical way.

However the use of extruded thermoplastic materials in this field is limited to extruded artifacts of reduced width since it is impossible to obtain, with conventional methods, adequate cross-section shapes having a considerable width.

Thus it was necessary to resort to composable shapes merely placed side by side or jointed with mortise and tenon type joints.

These mortise and tenon type joints, in addition to affording poor mechanical and structural strength, necessitate a large amount of workmanship for assembling.

As a matter of fact, taking into account the limited number of plastics which can be used for the extrusion of such artifacts, it has been found that the chemical and/or technological characteristics of these plastic materials impose some limitations on the known extrusion equipment, the results of these limitations being the impossibility of obtaining the widths and the thinner shapes in the desirable sections.

Thermoplastic materials, and more particularly polyvinyl chloride, are thermally unstable and thus, if they are kept at the extrusion temperatures beyond a certain time limit, deteriorate, irreversibly and progressively, the complete loss of any useful property being finally possible. Relatively stabler mixtures can be provided, but this, in addition to a cost increase, also involves a deterioration of other physical and mechanical specifications of the same plastics.

It is known that the extrusion of plastics materials is currently carried out with rotating screw extruders but the compulsory round outline of the screws in question falls far short of the widest and thin cross-section outline of the partition walls, or doors, one intends to obtain.

The skilled man in the extrusion art knows that the good quality of the extruded product (i.e., size precision, absence of internal stresses, homogeneousness, etc.) depends on the evenness and homogeneity of the flow of the plastics material through the extrusion orifice. By "evenness and homogeneity of flow through the extrusion orifice" is meant that the plastics material flows in every point of the extruder section (perpendicularly to the outlet direction) under essentially identical conditions of temperature, pressure, speed, composition, and structure. It is known that the structure of a polymeric plastics material is dependent also on the thermal and/or mechanical history thereof (degradation states, hysteresis phenomena and strain relieving): it is thus evident that, in order to obtain such a homogeneity, the extrusion passages must facilitate the flow of the plastics material in even conditions through the several zones of these passages.

The man skilled in the art knows also that, for semisolid thermoplastic materials, which are such at the extrusion temperatures, (such as rigid polyvinyl chloride), the pressure is distributed according to the frictional forces to be overcome, that is, it is distributed with different magnitudes as a function of the different distances and angular spacings of the point were the pressure is active.

In the light of these considerations, the result is that, in order that the best possible balance may be achieved, the cross-sectional area of the extrudate should virtually lie within the limits of the cross-sectional area of the screw (a factor which sharply contrasts with the widening which is required in order to obtain wider and wider sizes). Consequently, considerable and rapid widenings can be obtained only with materials which are in a fluid or semifluid state and in any case, with materials having an outstanding heat stability. These however are defective as to the necessary mechanical properties required for the artifacts contemplated by the present invention, and are only used for the manufacture of films, sheet materials and the like.

In the case of the thermoplastic materials, as for example polyvinyl chloride, in order to obtain a comparatively well distributed pressure throughout, a slow and progressive widening of the inner passage of the extruder head is required, the result being that, to get wide sizes of the desired artifacts, extrusion heads of relevant length in the flow direction should be provided. This however would keep the thermoplastic materials at the extrusion temperature for too long time intervals, and would be likely to originate stagnation areas, due to the long path of the plastics material within the extrusion head. Obviously, in these stagnation areas the plastics material would be unavoidably degraded.

The present invention relates to a method, and the relevant extrusion apparatus, which permit obtaining profiles having a limited thickness but a virtually unlimited width with the use of extruders having the conventional screws, by using plastic materials adapted for doors, partition walls and the like, having features equal or similar to those of the rigid polyvinyl chloride, which up to date has been exclusively limited to production of extrudates having very reduced width.

In fact, the several attempts made in order to obviate the disadvantages of an even flow distribution of the molten thermoplastic material, without degradation of the same, e.g., by providing multiple passages for the flow redistribution at the outlet of the extrusion screw, or by like members positioned near the extrusion orifice and others, have been found unsatisfactory both from the point of view of keeping the flow evenness, and because of the extremely high pressure drops and the many stagnation areas, which consequently and unavoidably are thus originated.

The method according to the present invention for the extrusion of profiles having a width far greater than height, is characterized by the inner passage of the extrusion head being fed with thermoplastic material at the extrusion temperature in a plurality of feeding points which are aligned parallely to the extrusion orifice, the distance between immediately adjacent feeding points being such as to prevent the peripheral fluid threads of the molten thermoplastic material from being deviated, as to the flow direction, at an angle greater than 45°, from the inlet to the outlet of the said inner passage of the extrusion head.

The method of the present invention, in fact, comprises the step of conveying towards the profile extrusion orifice the plastic material emerging from the heads of a plurality of conventional extruders, which are arranged in close side-by-side relationship so as to provide a thrust front which is single, parallel to the extrusion orifice and substantially uniform throughout the whole orifice width.

In turn, the extrusion apparatus built according to the present invention, is of the type comprising an extrusion head having an inner passage terminating in an extrusion orifice, the cross-sectional width of which is far greater than its height, and comprises a plurality of extruding screws, arranged side by side, for feeding the thermoplastic material at the extrusion temperature to the said inner passage of the extrusion head, the axes of said extrusion screws being essentially parallel to each other and at any rate positioned so as to prevent a deviation of the flow direction of the molten plastic material inside the extrusion passage higher than 45°, the outlets of these extrusion screws lying in a plane parallel to the plane of said extrusion orifice.

In practice, the above defined apparatus, comprising a plurality of parallel extruders, permits solving a number of problems inherent in extruded profiles having a large, and virtually unlimited width. As a matter of fact, such extrudates can have not only planar shapes, but also curved outlines with various radiuses; furthermore, they can have colors, features and compositions, which can also be variable throughout the artifact width.

The features of the present invention will now be described and illustrated in a clearer manner by way of example, with the aid of the figures of the accompanying drawings, wherein:

FIG. 1 is a perspective view of an extrusion head comprising an extrusion orifice I formed at the end of a section A connected to the conveying part B for the thermoplastic material, said part being integral with the extruding barrels C in whose inside the extrusion screws D are driven to rotate.

It is clearly illustrated that the screws are aligned and placed closely adjacent to one another, providing a parallel extrusion front having a considerable width and parallely directed extrusion thrusts.

Thus, from the extrusion orifice I there emerges an extrudate E which is very wide and has a comparatively reduced thickness.

The width of such an extrudate is theoretically infinite since the width is defined only by the number of the screws placed in side by side parallel relationship. Obviously, depending on the cross sectional shape of the extrudate E, suitable lands or solid parts are provided, as it is well known in the art, in the section A and in the extrusion orifice I.

Figure 1:
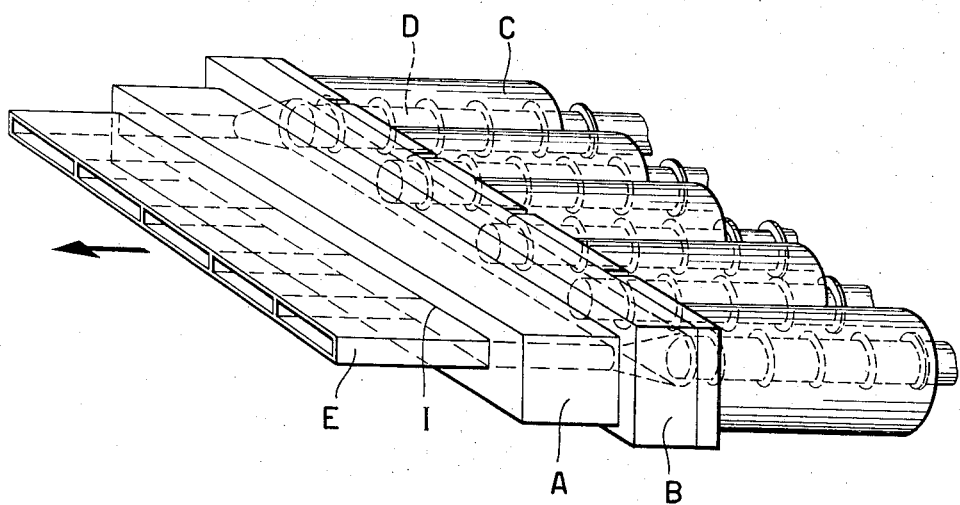
FIG. 1 is a perspective view of an extrusion apparatus built according to one embodiment of this invention.
Figure 2:
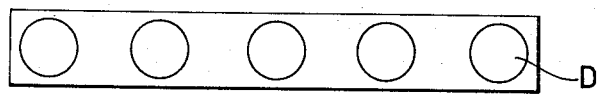
FIG. 2 is a diagrammatic view illustrating how the extruding barrels are aligned in the apparatus of FIG. 1.

FIG. 2 is diagrammatically illustrative of a possibility of aligning a plurality of parallel screws along a planar line.

Figure 3:
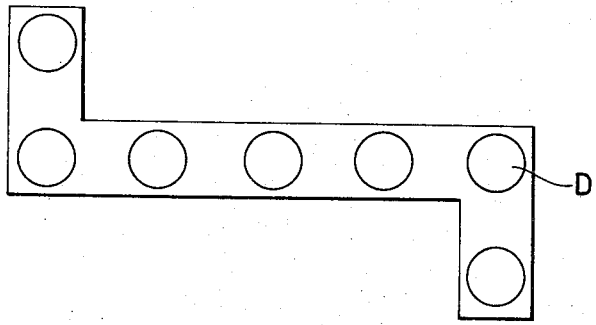
FIG. 3 illustrates diagrammatically another arrangement of the extruding barrels.

FIG. 3 diagrammatically shows an embodiment where a plurality of parallel screws are aligned along a segmented line, so as to provide an angular profile.

Figure 4:
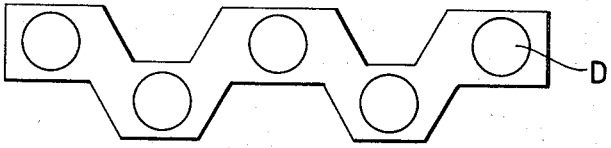
FIG. 4 is another diagrammatic view illustrating a further possible arrangement of the extruding barrels.

FIG. 4 diagrammatically shows an embodiment where a plurality of parallel screws are arranged alternately so as to provide a fretlike design.

Figure 5:
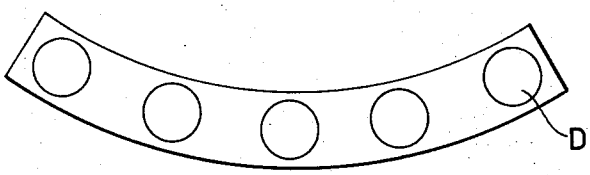
FIG. 5 is a diagrammatic view illustrating a still further possible arrangement of these barrels.

FIG. 5 diagrammatically shows an embodiment where a plurality of screws are parallely arranged along a curved line which can have curvatures of different radiuses.

Figure 6:
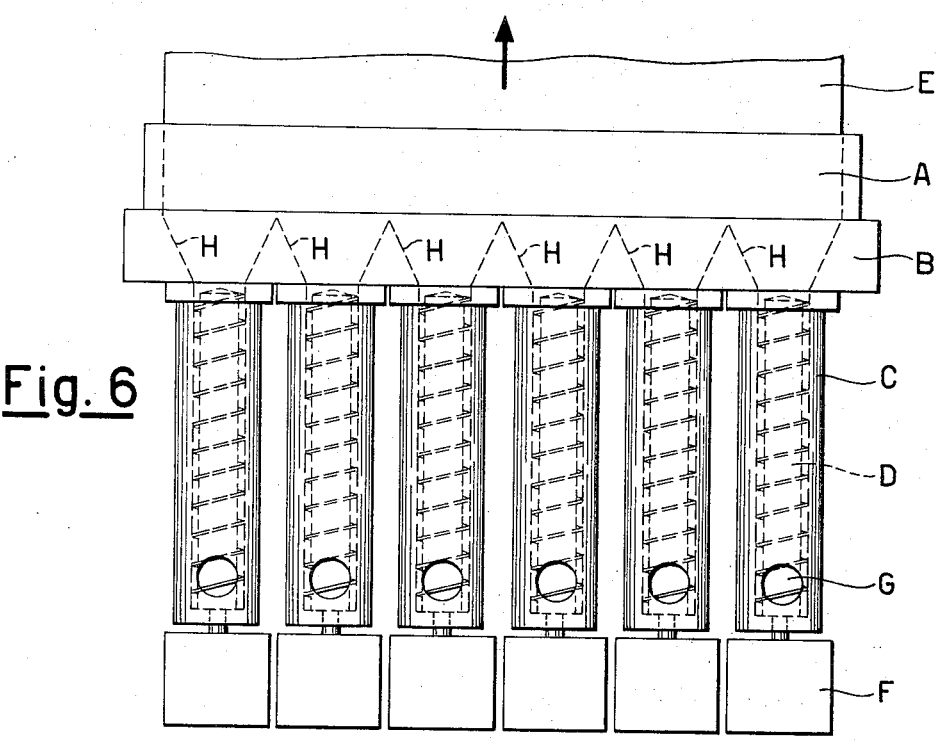
FIG. 6 is a fragmentary plan view of apparatus built according to one embodiment of this invention.

In FIG. 6, as outlined above there can be seen, at A the extrusion section from which the wide extrudate E emerges, the section A being connected to the conveying part B, the latter being releasably fastened to the barrels C containing the extrusion screws (D).

Each extrusion screw can be rotated independently with respect to the other screws which are in alignment therewith.

To this end, each screw receives, in a manner per se known, its drive from a prime mover F of its own.

At G the feeding port of each extruder screw for the plastics material is diagrammatically indicated.

The thermoplastic material, contained in suitable hoppers (not shown) connected to the feeding ports G is conveyed by the screws through the interior of the barrels C which are heated and whose temperature is controlled in a manner well known in the related art to an appropriate value, and comes out in the plasticized state, ready for the extrusion.

The already plasticized material is compressed in the conveying part B which, due to appropriate internal inclined guide inserts H conveys the material towards the section A and the extrusion orifice I in a direction which is parallel to the extrusion axis.

The principal object of the present invention becomes apparent should one consider the reduced length of the inserts H having mainly the function of avoiding flow deviations greater than 45°, so as to minimize the problems of leveling thrusts and friction.

This circumstance will permit having an extrusion head of a comparatively short length, the above enumerated shortcomings being thus done away with.

The section A will thus receive a front of plasticized material whose direction of advance is parallel to the extrusion axis.

This circumstance will permit, as seen for the part B above, having a limited path length, since it will no longer be necessary to render the flows of the several portions of the material parallel to each other.

Figure 9:
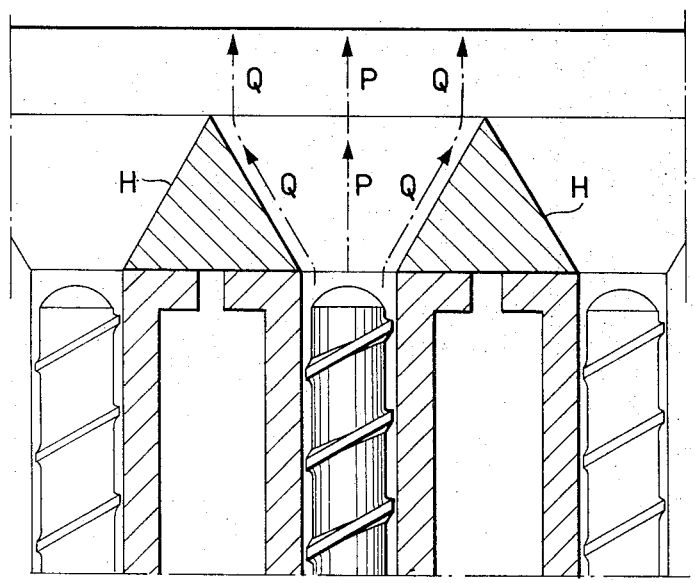
FIG. 9 is a fragmentary sectional view on an enlarged scale further illustrating the construction and operation of the several embodiments of the invention shown in FIGS. 6, 7 and 8.

The particular view of FIG. 9 illustrates the relationship between the inserts H and the outlet of each extrusion screw D, and particularly the fact that the peripheral flow threads, which follow the paths Q deviate with respect to the flow direction P by an angle less than 45°. In fact, the paths of the thermoplastic material indicated by P and Q are very little different and at any rate this difference does not affect the build-up of a pressure front, even and rectilinear, across the entire width of the extrusion section.

FIG. 6 shows an arrangement in which every screw receives an independent rotary drive by a motive and reducing gear of its own F. The purpose of such an arrangement is to be able to select, for each screw, an RPM which can be equal to, or different from, those of the other screws so as to equalize, or to make different, the speed of the flow of plastics material according to any particular extrusion requirement. In fact, for example, it is possible to increase the rotational speed of the side extruder screws with respect to the central ones, in order to compensate for the greater friction losses arising at the side walls of the extrusion head.

Figure 7:
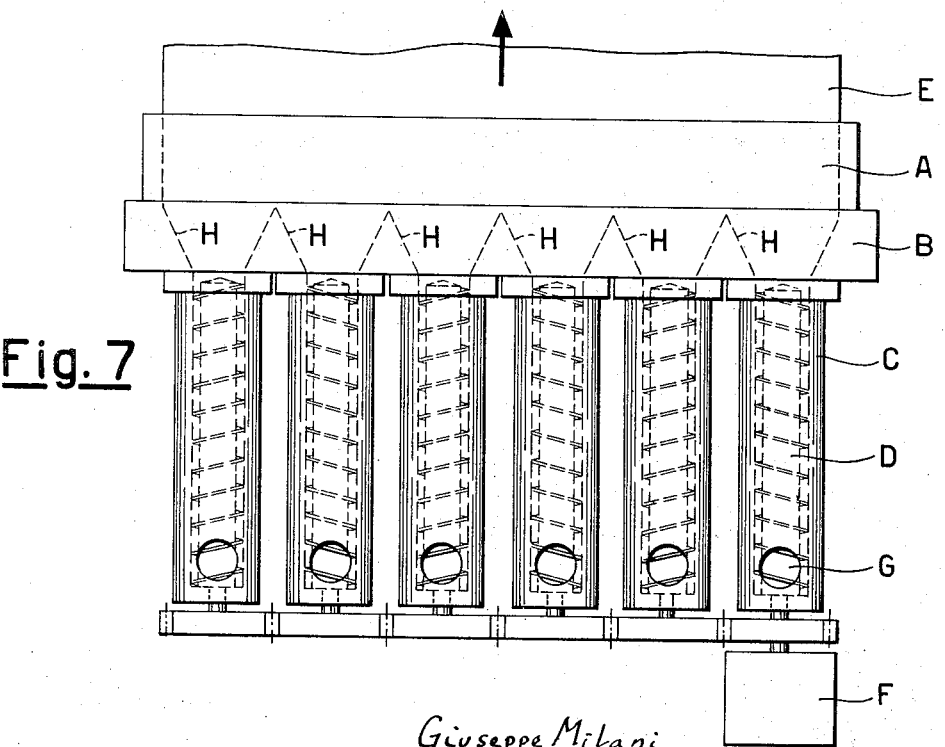
FIG. 7 is a diagrammatic plan view illustrating another embodiment.

FIG. 7, conversely, shows the case in which all the screws are interconnected so that the rotational drive is transferred by a single motive and reducing member F.

Figure 8:
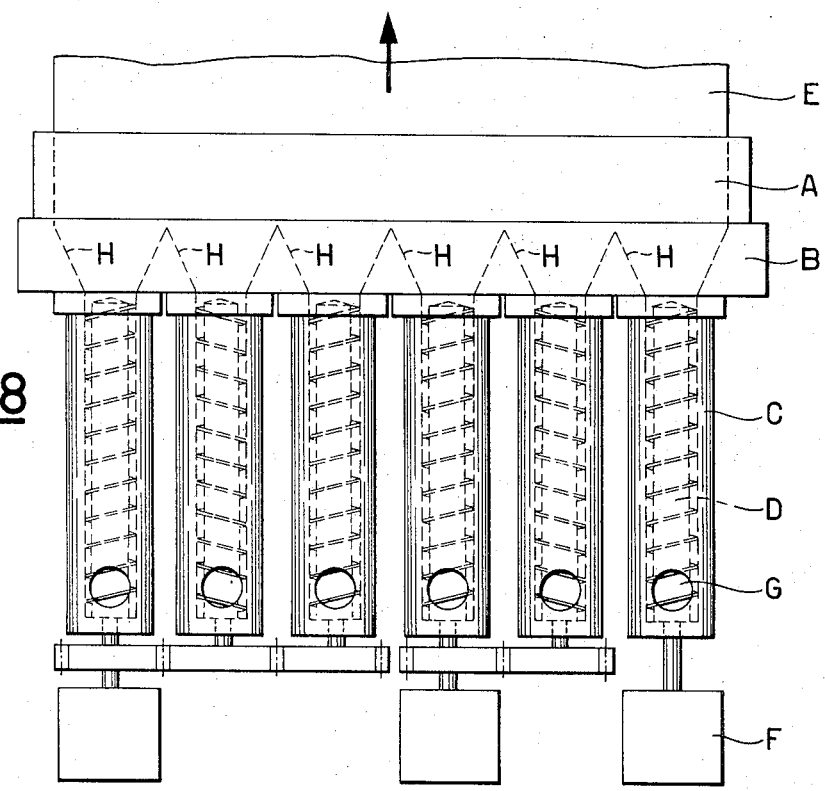
FIG. 8 is a diagrammatic plan view illustrating a still further embodiment.

FIG. 8 shows a combination arrangement of the two methods of drive already cited and shown in FIGS. 6 and 7, the rotational drive being obtained through discrete assemblies comprising one or more screws actuated in their rotational motion by motive members F of their own for each assembly.

That which has been shown in FIGS. 6, 7 and 8 refers to extrusion fronts obtained by aligning a plurality of screws having axes which are substantially parallel to each other.

The purpose of these several possible arrangements is to face and solve the most varied extrusion problems which may occur, such as the extrusion of very wide profiles formed by combining in the direction of width different plastics materials, which differ from each other as to quality, hardness, workability, degree of plasticity, color, and so forth.

It is also contemplated in the scope of the present invention the possible use of extrusion screws having the same or different diameters according to the extrusion requirements and/or to the structural features of the apparatus.

I claim:

1. Apparatus for the extrusion of articles having widths greater than their heights, comprising,
   a plurality of parallel tubular barrels,
   an extrusion screw journaled in each barrel to extend axially therethrough,
   the several screws being parallel to one another,
   each barrel having a port adjacent one end through which thermoplastic material may be fed into the respective barrel and an outlet at its opposite end through which the thermoplastic material may be fed from the respective barrel,
   an extrusion head having a shaped inner passage and having at one end an extrusion orifice having a cross-section corresponding to that of the article to be extruded,
   a connecting portion disposed between said extrusion head and said screws and having an enlarged inner passage communicating at one end with the outlets of all said barrels to receive therefrom the thermoplastic material and communicating at its opposite end with the passage in said extrusion head to deliver into said head said material, and
   a plurality of tapered inserts located in the inlet portion of said enlarged passage, one between each pair of extrusion screw outlets, to direct the thermoplastic material fed into the connecting portion by each extrusion screw toward that fed by the adjacent extrusion screw to effect joining of the thermoplastic material in the connecting portion,
   the sides of said inserts being inclined at an angle of less than 45° to the axes of said screws to prevent deviation of the flow direction of the thermoplastic material into the extrusion head at an angle higher than 45°, and means for driving said screws.

2. Apparatus according to claim 1, wherein said extrusion screws are all of the same diameter.

3. Apparatus according to claim 1 having separate means for driving the screws independently of one another.

4. Apparatus according to claim 1, wherein a single member drives all the screws simultaneously and they are mechanically connected all together.

5. Apparatus according to claim 1, wherein the screws are connected in units, each unit being formed by one or more screws, each unit being driven by a motive member of its own.

6. Apparatus according to claim 1, wherein the extrusion screws are aligned along a line so as to obtain a planar extrusion front.

7. Apparatus according to claim 1, wherein the extrusion screws are aligned along a segmental line so as to obtain an extrusion front having an open segmental outline.

8. Apparatus according to claim 1, wherein there is a plurality of screws aligned on an alternatively bent line so as to form an extrusion front having the shape of a fret, either regular or irregular.

9. Apparatus according to claim 1, wherein the extrusion screws are arranged along a curved line so as to form an extrusion front having an open curvilinear outline.

* * * * *